United States Patent
Robert et al.

(10) Patent No.: US 6,770,710 B2
(45) Date of Patent: Aug. 3, 2004

(54) PROCESS FOR OBTAINING A PHOTOCHROMIC LATEX

(75) Inventors: Anne Robert, Villecresne (FR); Pascale Tardieu, Paris (FR); Sylvette Maisonnier, Moisselles (FR); Jean-Paul Cano, Chennevieres sur Marne (JP)

(73) Assignee: Essilor International Compagnie Generale d'Optique, Charenton cedex (FR)

( * ) Notice: Subject to any disclaimer, the term of this patent is extended or adjusted under 35 U.S.C. 154(b) by 0 days.

(21) Appl. No.: 09/991,773

(22) Filed: Nov. 16, 2001

(65) Prior Publication Data

US 2002/0143088 A1 Oct. 3, 2002

(30) Foreign Application Priority Data

Nov. 17, 2000 (FR) .......................................... 00 14903

(51) Int. Cl.[7] .............................................. C08J 33/00
(52) U.S. Cl. ....................... 524/832; 524/833; 524/853; 524/89; 524/110; 524/104; 524/95
(58) Field of Search ........................................ 524/379

(56) References Cited

U.S. PATENT DOCUMENTS

| | | | |
|---|---|---|---|
| 3,567,605 A | | 3/1971 | Becker ........................ 204/158 |
| 4,011,388 A | | 3/1977 | Murphy et al. ............. 526/320 |
| 4,533,254 A | | 8/1985 | Cook et al. ................. 366/176 |
| 4,929,693 A | * | 5/1990 | Akashi et al. .............. 526/259 |
| 5,066,818 A | | 11/1991 | Gemert et al. .............. 549/389 |
| 5,114,621 A | | 5/1992 | Guglielmetti et al. ....... 252/586 |
| 5,569,716 A | | 10/1996 | Okamoto et al. ........... 525/192 |
| 5,653,965 A | | 8/1997 | Narayanan et al. ........... 424/59 |
| 5,686,518 A | * | 11/1997 | Fontenot et al. ............ 524/458 |
| 5,731,379 A | * | 3/1998 | Kennan et al. ............. 524/806 |
| 5,840,813 A | * | 11/1998 | Gornowicz et al. ......... 525/479 |
| 5,994,458 A | * | 11/1999 | Cheng et al. ............... 524/801 |
| 6,342,094 B1 | * | 1/2002 | Kabalnov ................ 106/31.25 |
| 6,362,248 B1 | * | 3/2002 | Hara et al. .................... 522/26 |
| 6,458,887 B1 | * | 10/2002 | Legros et al. ................ 524/801 |
| 2002/0128339 A1 | * | 9/2002 | Maisonnier et al. .......... 521/65 |
| 2002/0143088 A1 | * | 10/2002 | Robert et al. ................ 524/379 |

FOREIGN PATENT DOCUMENTS

| | | |
|---|---|---|
| EP | 0245020 | 11/1987 |
| EP | 0401958 | 12/1990 |
| EP | 0562915 | 9/1993 |
| EP | 0852239 | 7/1998 |
| FR | 2688782 | 9/1993 |
| FR | 2718447 | 10/1995 |
| FR | 2763070 | 11/1998 |
| FR | 2785904 | 5/2000 |
| FR | 2790264 | 9/2000 |
| JP | 3251587 | 11/1991 |
| WO | WO 89/05464 | 6/1989 |
| WO | WO 93/17071 | 9/1993 |
| WO | WO 94/20869 | 9/1994 |
| WO | WO 96/04590 | 2/1996 |
| WO | WO 98/50436 | 11/1998 |
| WO | WO 02/40548 A1 * | 5/2002 ............. C08F/2/44 |

OTHER PUBLICATIONS

"Latices" Encyclopedia of Polymer Science and Engineering, vol. 8, John Wiley & Sons: New York, 1987.*
Co-pending U.S. patent application Ser. No. 09/939,151, filed Aug. 24, 2001, by Sylvette Maisonnier et al.

* cited by examiner

Primary Examiner—Rip A. Lee
(74) Attorney, Agent, or Firm—Fulbright & Jaworski L.L.P.

(57) ABSTRACT

The process comprises:
(1) the preparation of a mixture comprising at least one organic monomer Z with a C=C group, polymerizable by a radical process, at least one organic photochromic compound, at least one surfactant, water and optionally a polymerization primer;
(2) the treatment of the mixture obtained in step (1) in order to form a miniemulsion consisting of an organic phase dispersed in the form of droplets having a diameter of 50 to 500 nm, and preferably 50 to 300 nm, in an aqueous phase;
(3) the addition to the miniemulsion of a polymerization primer, if this latter was not introduced in step (1), or of a quantity of primer additional to that added in step (1);
(4) the polymerization of the reaction mixture obtained in step (3), and
(5) the recovery of the photochromic latex.

17 Claims, No Drawings

PROCESS FOR OBTAINING A PHOTOCHROMIC LATEX

This application claims priority to French Application No. 00/14903 filed 17 Nov. 2000.

The present invention relates in a general manner to a process for obtaining a photochromic latex, in particular for applications in the optical field and preferentially in ophthalmic optics.

As is well known, latexes are emulsions of polymers, in particular aqueous emulsions.

These latexes are prepared conventionally by polymerization of an emulsion of monomers.

Typically, the polymerization of an emulsion requires the use of at least one monomer or mixture of monomers, one surfactant or mixture of surfactants, and an initiator or primer of polymerization. The monomer or mixture of monomers is dispersed as droplets with the aid of the surfactant or mixture of surfactants and by means of stirring with high shearing. The droplets of monomer usually have a diameter of 1 to 10 $\mu$m.

The latex emulsions obtained by the conventional processes have the disadvantage of being unstable, lack reproducibility and show size variations of the particles.

In order to correct these disadvantages, it has been proposed to seed the monomer droplets with polymer particles of known size and concentration. The seed particles, when they are in contact with the monomer droplets, swell to an equilibrium size. Such a procedure is described in the patent U.S. Pat. No. 4,011,388.

Although this seeding technique enables the number and dimension of the particles to be precisely controlled, it depends on the rate and degree of swelling of the particles.

A process for obtaining latex has also been proposed in the patent U.S. Pat. No. 5,686,518 which consists of dissolving one or more polymers in an ethylenically unsaturated monomer or mixture of such monomers and of dispersing the polymer solution in the monomer in water and at least one surfactant to obtain a "miniemulsion", the droplets of which have a mean diameter of 10 to 500 nm, then of polymerising the "miniemulsion" to obtain the final latex.

The use of miniemulsions for the emulsion polymerization is also described in the documents FR-2.785.904, EP-852-239, U.S. Pat. Nos. 5,569,716, 5,653,965 and WO-98/50436.

No document relates to the preparation of a photochromic latex.

The photochromic latexes are conventionally obtained by preparing a first solution containing the monomer(s) and the photochromic compound(s) and a second solution containing the dispersion medium, usually water and a surfactant, and by mixing the two solutions with vigorous stirring in order to obtain a pre-emulsion. The pre-emulsion is then transferred in one portion to a reactor and is degassed under nitrogen with stirring. At the end of the degassing the polymerization primer is introduced, usually dissolved in a solvent (typically water), and the polymerization is carried out by heating to obtain the latex.

The latex obtained is then coarsely filtered through cloth, then stored protected from light.

Such a process for obtaining a latex with photochromic properties is described in the document FR-2.790.264.

In addition to the problems of stability mentioned above, the photochromic latexes obtained by the conventional process show, during their synthesis, a considerable migration of the photochromic compound(s) into the aqueous phase, leading to a partial or complete degradation of the photochromic compounds in the final latex film. Consequently, the conventional processes require the use of considerable quantities of expensive photochromic compounds to compensate for these losses by migration.

Hence the purpose of the invention is to furnish a process for obtaining a photochromic latex which limits, even suppresses, the migration of the photochromic compounds into the aqueous phase of the latex during its synthesis.

According to the invention, the process for obtaining a photochromic latex comprises:

(1) the preparation of a mixture comprising at least one organic monomer Z with a C=C group, polymerizable by a radical process, at least one organic photochromic compound, at least one surfactant, water and optionally a polymerization primer;
(2) the treatment of the mixture obtained in step (1) in order to form a miniemulsion consisting of an organic phase dispersed in the form of droplets having a diameter of 50 to 500 nm, and preferably 50 to 300 nm, in an aqueous phase;
(3) the addition to the miniemulsion of a polymerization primer, if this latter was not introduced in step (1), or of a quantity of primer additional to that added in step (1);
(4) the polymerization of the reaction mixture obtained in step (3), and
(5) the recovery of the photochromic latex.

In a preferred embodiment of the process of the invention, a stabilization agent of the miniemulsion is added to the mixture in step (1).

Preferably, the mixture of step (1) is obtained by preparing separately a solution A containing the monomer(s), the photochromic compounds and, optionally, the stabilization agent(s) and a solution B containing water and the surfactant(s), then by combining the two solutions A and B.

The mixture of the two solutions A and B is then treated, for example by means of a microfluidiser in order to obtain a miniemulsion, the diameter of the droplets of the organic phase of which varies from 50 to 500 nm, preferably from 50 to 300 nm and typically is of the order of 200 nm.

The microfluidiser is a high pressure impact emulsifier. Such a microfluidiser is described in the patent U.S. Pat. No. 4,533,254 and is marketed by the Microfluidics Corporation company in Naston, Mass., USA. Another microfluidiser is sold by the Stansted Fluid Power company Ltd. Briefly, the apparatus consists of a high pressure pump and an interaction chamber where the emulsion is prepared. Usually, the mixture is passed once into the emulsifier at a pressure of 35 to 105 MPa.

The size of the droplets will vary as a function of the composition of the mixture, the pressure applied and the number of passes in the emulsifier.

Thus, with a pressure of 70 MPa, miniemulsions according to the invention were obtained having a droplet diameter of about 200 nm.

The miniemulsion can also be obtained with ultrasonic devices or mechanical stirrers of the Ultraturax™ type.

The miniemulsion obtained is then usually transferred directly to a reactor where it is degassed. This degassing is usually performed under nitrogen, with stirring and at a temperature that may vary from room temperature to 90° C., preferably at a temperature of 40 to 70° C.

Once the degassing is complete, one or more polymerization primers is/are added directly to this reactor and the polymerization of the monomer(s) is carried out with stirring and preferably at a temperature higher than room temperature, usually from 50 to 90° C.

Optionally, during polymerization a minor quantity, usually less than 10%, and preferably less than 5% by mass with respect to the mass of the initial Z monomer, of one or more other polymerizable monomers may be added dropwise in order, for example, to modify the mechanical properties of the latex particles.

The polymerization reaction is terminated when the dry extract content of the emulsion has stabilized.

At this stage it is possible to incorporate into the latex obtained, concomitantly with a polymerization primer, one or more other polymerizable monomers, for example acrylates or methacrylates to obtain a latex, the particles of which are of the core/shell type.

The latex obtained is recovered conventionally, for example by filtration through cloth.

Usually the polymer particles of the latex obtained have a diameter of 50 to 400 nm.

The Z monomers recommended are monomers of the alkyl (meth) acrylate type, preferably of the mono(meth)acrylate type.

The alkyl groups are preferably $C_1-C_{10}$ alkyl groups, such as methyl, ethyl, propyl and butyl.

Of the preferred monomers the methyl, ethyl, propyl and butyl acrylates and methacrylates may be mentioned.

It is also possible to use mixtures of these monomers, in particular mixtures of $C_2-C_{10}$ alkyl acrylate and $C_1-C_3$ alkyl methacrylate monomers.

The organic photochromic compounds suitable for the process of the invention are all organic compounds exhibiting photochromic properties. The compounds are well-known in the state of the art.

The preferred compounds are chromenes and spiroxazines.

These chromenes are described, among other sources, in the documents U.S. Pat. Nos. 3,567,605, 5,066,818, WO-93/17071, WO-94/20869, FR-2,688,782, FR-2,,718,447, EP-0,401,958 and EP-0,562,915.

The spiroxazines are also well-known photochromic compounds. Such compounds are described, among other sources, in the patents U.S. Pat. No. 5,114,621, EP-0,245,020, JP-A-03,251,587, WO-96/04590 and FR-2,763,070.

The photochromic compound is introduced in sufficient quantity to obtain the desired photochromic effect in the final latex films.

The concentrations of photochromic compound usually vary from 1 to 10% and preferably from 2 to 7% by weight, with respect to the weight of polymerizable monomers present in the latex.

In order to facilitate the dissolution of the photochromic compound, it is possible to add to this mixture a small quantity of a solvent of the photochromic compound, for example N-methylpyrrolidone in the case of the chromenes. The quantity of solvent added may attain 5% by weight with respect to the weight of the polymerizable monomers present in the mixture.

The surfactant may be ionic, non-ionic or amphoteric. Of the ionic surfactants, mention may be made of sodium dodecylsulfate, sodium dodecylbenzene sulfate, sodium sulfonate, the sulfates of ethoxylated fatty alcohols and cetyl trimethylammonium bromide (CTAB).

Of the non-ionic surfactants, mention may be made of ethoxylated fatty alcohols.

It is obviously possible to use a mixture of surfactants.

The stabilization agent optionally added may be any compound which stabilizes the emulsion and which is not prejudicial to the desired properties of the latexes and the films formed from these latexes.

The stabilization agent may be an n-alkane, an halogenated n-alkane or a polymerizable or non-polymerizable monomer, comprising a fatty chain such as a fatty alcohol or an ester of a fatty alcohol.

The preferred stabilization agents are hexadecane, cetyl alcohol and stearyl methacrylate.

The particularly preferred agent is stearyl methacrylate because it is integrated into the network owing to the presence of the methacrylate function.

The content of stabilization agent in the mixture usually varies from 0.1 to 10%, preferably from 2 to 6%, with respect to the weight of polymerizable monomers present in the mixture.

The polymerization primer may be any primer conventionally used. It may be soluble in water or in the organic phase.

The water-soluble primers used for the polymerization of the compositions of the invention are salts and compounds possessing at least one hydrophilic function.

Of these salts and compounds, mention may be made of alkali metal and ammonium persulfates, in particular sodium or potassium persulfates, hydrogen peroxide and 2,2'-azobis (2-amidino propane) dihydrochloride.

It is also possible to use partially water-soluble peroxides such as persuccinic acid and t-butyl hydroperoxide.

It is also possible to use redox systems such as the persulfates combined with a ferrous ion.

Mention may also be made of cumyl hydroperoxide or hydrogen peroxide, in the presence of ferrous, sulfite or bisulfite ions.

Of the primers soluble in the organic phase mention may be made of azobisisobutyronitrile (AIBN).

The aqueous phase of the miniemulsion may consist only of water or it may comprise a mixture of water and an appropriate solvent, for example in order to aid film formation. When a solvent is present, it may usually represent up to 10% by weight of the aqueous phase, preferably less than 5% by weight and better still less than 2%.

Preferably, the aqueous phase consists only of water.

Unless indicated otherwise, all the percentages and parts in the following examples are expressed by weight,

EXAMPLES 1 TO 5 AND COMPARATIVE EXAMPLES A AND B

The mixtures, the compositions of which are indicated in Table (I), were prepared by combining a solution A containing the polymerizable monomer, the stabilization agent and the photochromic compound with a solution B containing the surfactant and water.

TABLE 1

|  | MIXTURE | | | | | |
|---|---|---|---|---|---|---|
|  | 1 | 2 | 3 | 4 | 5 | 6 |
| Polymerizable monomer | | | | | | |
| Butyl methacrylate (g) | 46.4 | — | 46.4 | — | 46.4 | — |
| Butyl acrylate (g) | — | 46.4 | — | 46.4 | — | 46.4 |
| Photochromic compound | | | | | | |
| Spiro A (g) | 3.25 | 3.25 | — | — | — | — |
| Chromene B (g) | — | — | 3.25 | 3.25 | 3.25 | 3.25 |

TABLE 1-continued

| | MIXTURE | | | | | |
|---|---|---|---|---|---|---|
| | 1 | 2 | 3 | 4 | 5 | 6 |
| Surfactant | | | | | | |
| Cetyl trimethylammonium bromide (g) | 1.5 | 1.5 | 1.5 | 1.5 | 1.5 | 1.5 |
| Stabilization agent | | | | | | |
| Stearyl methacrylate (g) | 2.32 | 2.32 | 2.32 | 2.32 | — | — |
| Water (g) | 73 | 73 | 73 | 73 | 73 | 73 |

In order to facilitate the dissolution of the chromene B, 3.8% by weight of N-methylpyrrolidone with respect to the weight of monomer were added to solution A.

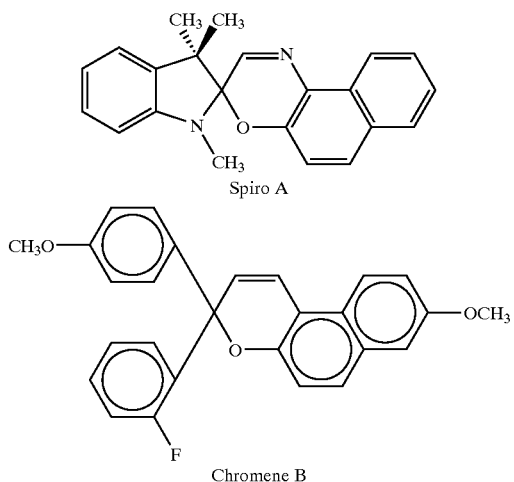

Spiro A

Chromene B

The mixtures 1 to 4 are treated so as to obtain a miniemulsion according to the invention (Examples 1 to 5) and the mixtures 5 and 6 are treated conventionally to obtain a standard emulsion (Comparative examples A and B).

In order to obtain the miniemulsion according to the invention, the mixtures are treated by a single pass in the Stansted Fluid Power Ltd. microfluidiser, model nm–CEN 7400H at a pressure of 70 MPa. The droplets of the miniemulsions recovered at the exit have a mean diameter of 225 nm.

The standard emulsions are obtained by simple mechanical stirring of the mixtures 5 and 6.

The standard emulsions and the miniemulsions of the invention are then transferred to a reactor and subjected to degassing under nitrogen for 30 minutes at 60° C., and with stirring using a stirrer rotating at 250 rev./minute.

After degassing, the droplets of the miniemulsions according to the invention have a mean diameter of 214 nm.

In the case of the standard emulsions, the droplets have a diameter of the order of 1 $\mu$m.

A solution of primer is prepared by dissolving 0.48 g of 2,2'-azobis (2-amidinopropane) dihydrochloride in 4.8 g of water and this solution is added in one portion to the reactor containing 103 g of emulsion or miniemulsion in order to initiate the polymerization reaction, with the exception of Example 2 to which the same quantity of azobis isobutyronitrile (2) was added directly.

The polymerization is carried out at a temperature of 60° C.

When polymerization is complete (2 h 45 after the addition of the primer), heating is stopped and the mixture is allowed to cool to room temperature (23° C.). The latexes are then drawn off at 23° C. and filtered through cloth.

The latexes of Examples 1 to 5 have a dry extract of 37% by weight.

The standard latexes obtained by the conventional process have a dry extract of 40% by weight.

The dry extract is conventionally measured by drying the latex in a desiccator to constant weight.

The mean diameter of the droplets and particles is determined by a Zetasizer (MALVERNE), by means of light scattering.

Photochromic, transparent films 3.7 $\mu$m thick are prepared by centrifugal deposition [200 rev./minute for 10 s, then 1000 rev./minute for 10 s] of the preceding latexes on Sigmal® glasses and drying in an oven at 50° C.

The films were recovered and extracted with 10 ml of acetonitrile at 80° C. in the presence of an internal standard Kemix No. 16. This extraction at 80° C. out for 20 minutes. After being shaken, the solution is filtered, then analyzed by reversed phase high performance liquid chromatography (HPLC). The chromatography is performed on a Kromasil® C18 column (Touzart & Matignon).

The eluent is an acetonitrile/water (80/20) mixture, elution is performed in the isocratic or gradient mode and the rate of elution is 1 ml/minute. The detector used is a Waters 484 detector at 230 nm.

The yield of photochromic compound is the ratio of the quantity of photochromic compound recovered in the film compared with the expected theoretical quantity.

The results are given in Table II below.

TABLE II

| Example | Mixture n° | Yield of photochromic compound (%) |
|---|---|---|
| A | 5 | 62 |
| B | 6 | 60 |
| 1 | 1 | 100 |
| 2 | 1* | 100 |
| 3 | 2 | 96 |
| 4 | 3 | 87 |
| 5 | 4 | 89 |

*(AIBN primer in the organic phase)

The results in Table II show that the process of the invention diminishes, even suppresses, the loss of photochromic compound in the latex during synthesis and does so irrespective of the family of photochromic compound used.

EXAMPLE 6

The mixture, the composition of which is indicated hereafter, is prepared by combining a solution A containing the polymerizable monomer, the stabilization agent and the photochromic compound to a solution B containing the surfactants and water.

| Polymerizable monomer | |
|---|---|
| Butyl methacrylate | 46.4 g |
| Photochromic compound | |
| Spiro A | 3.25 g |

-continued

| Surfactant | |
|---|---|
| DISP 3065 | 1.493 g |
| DIP 0988 | 0.988 g |
| Stabilization agent | |
| Stearyl methacrylate | 2.32 g |
| Water | 50 g |

DISP 3065 = DISPONIL A 3065 = fatty alcohol mixture containing 30 ethoxylated units.
DIP 0988 = DISPONIL FES 0988 = $C_{12-14}H_{25-29}(OCH_2CH_2)_{12}OSO_3^-Na^+$ (products supplied by the SIDOBRE SINNOVA company).

After degassing, the droplets of the miniemulsion according to the invention have a mean diameter of 250 nm.

A primer solution is prepared by dissolving 0.19 g of sodium persulfate in 1.9 g of water and this solution is added in one portion to the reactor containing 96 g of miniemulsion to initiate the polymerization reaction.

The polymerization is carried out at a temperature of 60° C. and samples are taken at regular intervals and the contents or dry extracts and the mean diameter of the particles are determined.

The results are given in Table (III).

TABLE III

| Polymerization time (minutes) | Dry extract (% dry weight) | Mean particle diameter (nm) |
|---|---|---|
| 30 | 15 | 230 |
| 60 | 28.5 | — |
| 90 | 31.7 | 230 |
| 165 | 31.7 | 240 |

When polymerization is complete (2 h 45 after the addition of the primer), heating is stopped and the mixture is allowed to cool to room temperature (23° C.). The latexes are then drawn off at 23° C. and filtered through cloth.

The latex possesses the following characteristics:

| Dry extract | 36% by weight |
|---|---|
| Mean particle diameter | 230 nm |

A photochromic latex is thus obtained containing the photochromic compound in excellent yield when synthesis is complete.

What is claimed is:

1. A method of obtaining photochromic latex comprising:
preparing a mixture comprising at least one organic monomer Z, which monomer comprises at least one C=C group and is polymerizable by a radical process, at least one organic photochromic compound, at least one surfactant, and water;
forming a miniemulsion of the mixture, the miniemulsion comprising an organic phase dispersed in an aqueous phase in the form of droplets having a diameter of 50 to 500 nm;
adding a polymerization primer to the mixture before, during, or after forming the miniemulsion;
polymerizing of the reaction mixture, and
recovering photochromic latex.

2. The method of claim 1, wherein the polymerization primer is mixed with the other components of the mixture before formation of the miniemulsion.

3. The method of claim 2, wherein additional polymerization primer is added to the mixture after formation of the miniemulsion.

4. The method of claim 1, wherein the polymerization primer is mixed with the other components of the mixture after formation of the miniemulsion.

5. The method of claim 1, further comprising degassing the miniemulsion before the addition of the polymerization primer.

6. The method of claim 1, wherein the polymerization primer is added to the mixture during the formation of the miniemulsion.

7. The method of claim 1, wherein the organic phase is dispersed in the aqueous phase in the form of droplets having a diameter of 50 to 300 nm.

8. The method of claim 1, wherein the organic monomer Z is an alkyl (meth) acrylate.

9. The method of claim 1, wherein the photochromic compound is a chromene or spirooxazine.

10. The method of claim 1, wherein the Z monomer is an alkyl methacrylate and the photochromic compound is a spirooxazine.

11. The method of claim 1, wherein the mixture further comprises at least one stabilization agent.

12. The method of claim 11, wherein the stabilization agent is an n-alkane, a halogenated n-alkane, a fatty alcohol, or an ester of a fatty alcohol.

13. The method of claim 12, wherein the stabilization agent is hexadecane, cetyl alcohol, or stearyl methacrylate.

14. The method of claim 1, wherein the polymerization primer is soluble in the aqueous phase or in the organic phase.

15. The method of claim 14, wherein the polymerization primer is azobisisobutyronitrile or 2,2'-azobis (2-amidinopropane) dihydrochloride or sodium persulfate.

16. The method of claim 1, wherein formation of the miniemulsion comprises passing the mixture through a microfluidizing apparatus.

17. A photochromic latex prepared by a method comprising:
preparing a mixture comprising at least one organic monomer Z, which monomer comprises at least one C=C group and is polymerizable by a radical process, at least one organic photochromic compound, at least one surfactant, and water;
forming a miniemulsion of the mixture, the miniemulsion comprising an organic phase dispersed in an aqueous phase in the form of droplets having a diameter of 50 to 500 nm;
adding a polymerization primer to the mixture before, during, or after forming the miniemulsion;
polymerizing of the reaction mixture, and
recovering photochromic latex.

* * * * *

UNITED STATES PATENT AND TRADEMARK OFFICE
CERTIFICATE OF CORRECTION

PATENT NO. : 6,770,710 B2
DATED : August 3, 2004
INVENTOR(S) : Robert et al.

It is certified that error appears in the above-identified patent and that said Letters Patent is hereby corrected as shown below:

<u>Title page,</u>
Item [75], Inventor, please delete "Chennevieres sur Marne (JP)" and insert
-- Chennevieres sur Marne (FR) --.

Signed and Sealed this

Eighth Day of February, 2005

JON W. DUDAS
*Director of the United States Patent and Trademark Office*